(12) United States Patent
Ishisako (10) Patent No.: US 11,249,732 B2
(45) Date of Patent: Feb. 15, 2022

(54) GUI CONTROLLER DESIGN SUPPORT DEVICE, SYSTEM FOR REMOTE CONTROL AND PROGRAM

(71) Applicant: LC-STUDIO CORPORATION, Komae (JP)

(72) Inventor: Kunihito Ishisako, Komae (JP)

(73) Assignee: LC-STUDIO CORPORATION, Tokyo (JP)

( * ) Notice: Subject to any disclaimer, the term of this patent is extended or adjusted under 35 U.S.C. 154(b) by 0 days.

(21) Appl. No.: 17/044,596

(22) PCT Filed: Dec. 17, 2019

(86) PCT No.: PCT/JP2019/049488
§ 371 (c)(1),
(2) Date: Oct. 1, 2020

(87) PCT Pub. No.: WO2021/019801
PCT Pub. Date: Feb. 4, 2021

(65) Prior Publication Data
US 2021/0089277 A1    Mar. 25, 2021

(30) Foreign Application Priority Data
Jul. 26, 2019   (JP) .............................. JP2019-137463

(51) Int. Cl.
*G06F 9/451* (2018.01)
*G06F 3/041* (2006.01)
(Continued)

(52) U.S. Cl.
CPC ................ *G06F 8/33* (2013.01); *G06F 3/041* (2013.01); *G06F 3/0481* (2013.01);
(Continued)

(58) Field of Classification Search
CPC . G06F 8/33; G06F 9/451; G06F 3/041; G06F 3/0481; G06F 3/0488; G06F 8/38
See application file for complete search history.

(56) References Cited

U.S. PATENT DOCUMENTS 9,824,578 B2 * 11/2017 Burton .................. G08C 17/02
2010/0138764 A1   6/2010 Hatambeiki et al.
(Continued)

FOREIGN PATENT DOCUMENTS

JP       2019-085041 A    6/2019

OTHER PUBLICATIONS

Jun. 7, 2021 Extended European Search Report issued in European Patent Application No. 19926726.1.

*Primary Examiner* — Ziaul A Chowdhury
(74) *Attorney, Agent, or Firm* — Oliff PLC (57) ABSTRACT

A GUI controller design support device can support the programming of a controller device that is capable of changing control and/or graphic representation flexibly and in real time. The GUI controller design support device supports the designing of a GUI controller that is displayed on a touch-sensitive panel display of an input device and that receives an operation input for operating a target device. The GUI controller design support device is provided with: a GUI controller editing unit for editing a controller set, the controller set being configured by a plurality of controller parts and defining the GUI controller; and a user program editing unit for editing a user program, the user program defining control of the target device in response to the operation input to the GUI controller.

1 Claim, 3 Drawing Sheets

(51) Int. Cl.
*G06F 3/0481* (2013.01)
*G06F 8/38* (2018.01)
*G06F 8/33* (2018.01)
*G06F 3/0488* (2013.01)

(52) U.S. Cl.
CPC .............. *G06F 3/0488* (2013.01); *G06F 8/38* (2013.01); *G06F 9/451* (2018.02)

(56) References Cited

U.S. PATENT DOCUMENTS

| | | | | |
|---|---|---|---|---|
| 2011/0191516 A1* | 8/2011 | Xiong | ...................... | G06F 3/041 |
| | | | | 710/305 |
| 2015/0137959 A1* | 5/2015 | Kim | ....................... | G08C 17/02 |
| | | | | 340/12.28 |
| 2017/0068424 A1* | 3/2017 | Hong | ................ | H04M 1/72415 |
| 2017/0185081 A1* | 6/2017 | Steele | .................. | G05D 1/0016 |
| 2020/0363943 A1* | 11/2020 | Millington | ................ | G06F 8/20 |
| 2020/0387297 A1* | 12/2020 | Wheeler | ............. | G06F 3/04845 |

* cited by examiner

GUI CONTROLLER DESIGN SUPPORT DEVICE, SYSTEM FOR REMOTE CONTROL AND PROGRAM

FIELD OF THE INVENTION

The present invention relates to GUI controller design support devices that support the designing and programming of controllers implemented by GUIs (Graphical User Interfaces).

BACKGROUND ART

Providing controller devices for remotely operating, via wireless communication, radio-controlled (RC) cars, drones, robots, gaming and the like as GUIs, such as operating buttons, displayed on smartphone screens and the like has conventionally been achieved (see, for example, Patent Document 1).

PRIOR ART DOCUMENTS

Patent Documents

Patent Document 1: Japanese Unexamined Patent Application Publication No. 2019-085041

SUMMARY OF THE INVENTION

Problems to be Solved by the Invention

With such GUI-based controller devices, after activating devices to be operated, the devices are configured either such that the control after receipt of signals is fixed or such that only simple changes are allowed (such as changes of polarities, gains and the like for certain operating parameters). For this reason, an addition of new behaviors and/or a dynamic addition of parameters themselves cannot be made. Furthermore, the devices to be operated need to be re-activated for every instance of trial-and-error, which is repeated until desired control is achieved successfully, and an enormous amount of time is therefore needed in order to achieve complex control by means of programming, such as automatic operation.

An object of the present invention is to provide a GUI controller design support device that solves the above-described problem and that supports the programming of a controller device that is capable of changing control and/or graphic representation flexibly and in real time.

Means for Solving the Problems

In order to solve the above-described problem, a GUI controller design support device according to the present invention supports designing of a GUI controller that is displayed on a touch-sensitive panel display of an input device and that receives an operation input for operating a target device. The GUI controller design support device is provided with: a controller set editing unit that edits a controller set, the controller set containing and being configured by a plurality of controller parts and defining the GUI controller; a controller part editing unit that edits the respective controller parts contained in the controller set; and a user program editing unit that edits a user program, the user program defining control of the target device in response to the operation input to the controller part.

According to the present invention, the GUI controller design support device may further be provided with a GUI controller registration unit that registers the controller set edited at the controller editing unit with the input device in a state where an engine activates an execution environment for executing the user program, the engine being operated by a driver that is an object called from the user program and utilized in order to control the target device.

In addition, the GUI controller design support device may further be provided with a user program registration unit that registers the user program edited at the user program editing unit with the engine in a state where an engine, on which a driver that is an object called from the user program and utilized in order to control the target device is operated, activates an execution environment for executing the user program.

Moreover, in order to solve the above-described problem, a system for remote control according to the present invention is provided with: any of the above-described GUI controller design support devices; an input device provided with a touch-sensitive panel display, the touch-sensitive panel display displaying a GUI controller; and an engine that is operated by a driver that is an object called from the user program and utilized in order to control the target device. In this system for remote control, the input device receives a user operation input to the GUI controller displayed on the touch-sensitive panel display and transmits content of the operation input to the engine and the engine operates the driver to control the target device based on the content of the operation input received from the input device. The input device enables updating of the controller set of the GUI controller associated with the user program in a state where the engine activates an execution environment for executing the user program. The engine also enables updating of the user program in a state where an execution environment is activated for executing the user program.

Furthermore, in order to solve the above-described problem, a program according to the present invention causes a computer to function as any of the above-described GUI controller design support devices.

EMBODIMENTS OF THE INVENTION

Embodiments of the present invention will be described hereinafter based on the drawings. It should be noted that, in the following description, identical reference numerals are denoted to identical members and the description of already-described members will be omitted when relevant.

Configuration of Environment for Remote Control

Figure 1:
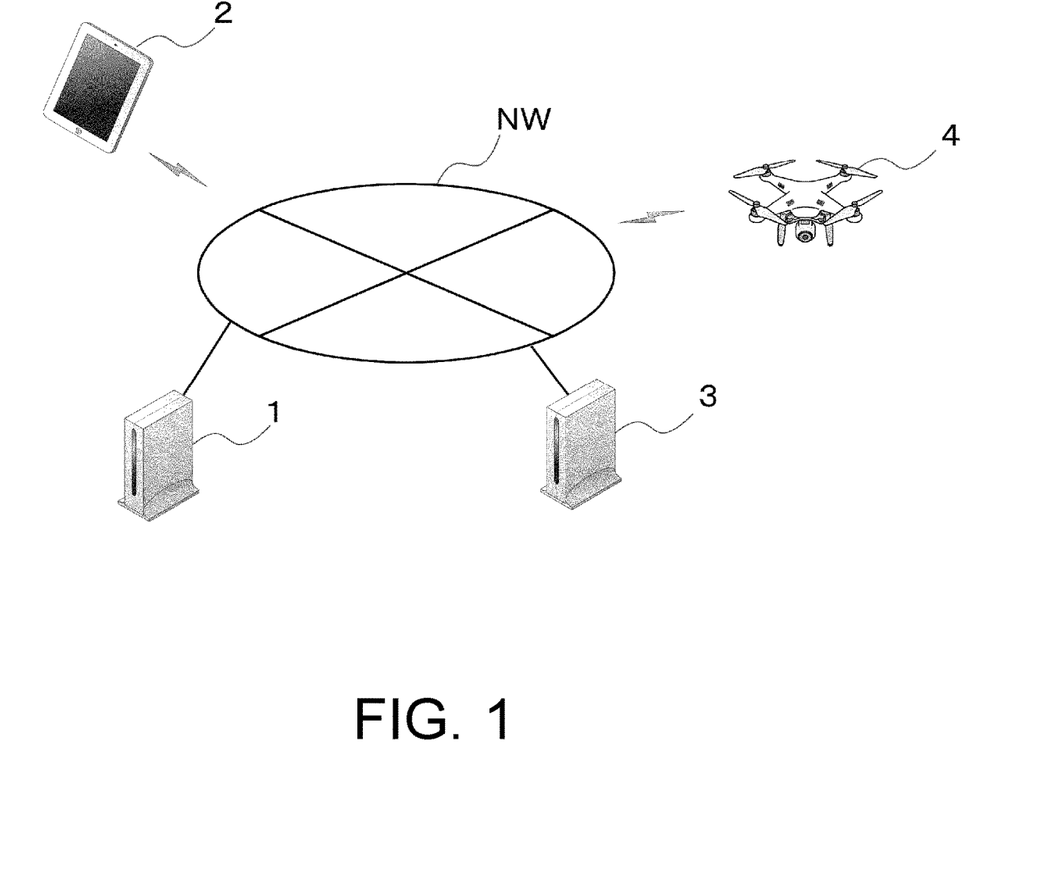
FIG. 1 illustrates an example of an environment for remote control to which a GUI controller design support device 1 is applied.

FIG. 1 illustrates an example of an environment for remote control to which a GUI controller design support device 1 according to the present embodiment is applied. Specifically, in this environment for remote control, a control signal is transmitted to a target device 4, which is a target to be operated, via an engine 3 in response to an operational input made by a user to an input device 2, and then control of the target device 4 is implemented. The GUI controller design support device 1: performs designing of an operation screen displayed on the input device 2, editing of programs executed on the engine 3 in response to the operational input to the input device 2 and any other operation; and provides the environment for updating these operations when appropriate. The GUI controller design support device 1, the input device 2 and the engine 3 are enabled to communicate with each other via a network NW. It should be noted that all or part of the GUI controller design support device 1, the input device 2 and the engine 3 may be implemented by common hardware. The engine 3 and the target device 4 are also enabled to communicate with each other by way of wireless communication means (whether or not via the network NW is optional).

The GUI controller design support device 1 is a device that provides a user with functions to perform editing of a GUI controller and a user program, editing of an execution environment, which is an environment on the engine 3 where the user program is executed, editing of a driver, which is an object that is called from the user program and used to control the target device 4, and any other operations, and is implemented by a computer and the like. The GUI controller design support device 1 is provided with a control unit 10, a memory unit 11, a display unit 12, an input unit 13 and a communication unit 14.

The control unit 10 implements the functions of the GUI controller design support device 1 by executing various programs stored in the memory unit 11. In particular, the control unit 10 implements various functions including a GUI controller editing function and a user program editing function, which will be described hereinafter. The control unit 10 is implemented by, for example, a CPU and the like.

The memory unit 11 stores a program to be executed in the control unit 10, data to be used in such program and any other programs/data. Specifically, the memory unit 11 stores the program and data for implementing the GUI controller editing function and user program editing function. For example, the memory unit 11 may store a template for a controller part available to the user in the GUI controller editing function.

The display unit 12 is a display element such as a liquid crystal display or an organic EL display, and displays, under control of the control unit 10, various types of information. The input unit 13 receives a user operation. The input unit 13 can be, for example, a keyboard, a mouse or a touch-sensitive panel that is superimposed and provided on the display unit 12. The communication unit 14 communicates with the input device 2, the engine 3 and any other components via the network NW and/or other communication lines.

The input device 2 displays a screen for a GUI controller created and edited by the GUI controller design support device 1, receives an operation input to such GUI controller and then transmits the content of the received operation input to the engine 3. The input device 2 is provided with a control unit 20, a memory unit 21, a display unit 22, an input unit 23 and a communication unit 24.

The control unit 20 implements functions of the input device 2 by executing various programs stored in the memory unit 21. In particular, the control unit 20 implements a function of causing the screen for the GUI controller to be displayed on the input unit 23, a function of receiving a user operation input to the respective controller parts configuring the GUI controller and transmitting the content of the received operation input to the engine 3 via the communication unit 24, and any other function. The control unit 20 is implemented by, for example, a CPU and the like.

The memory unit 21 stores a program to be executed in the control unit 20, data to be used in such program and any other program/data. Specifically, the memory unit 21 stores a controller set CL defining the GUI controller, a drawing program for causing the screen for the GUI controller to be displayed on the display unit 22 in accordance with the controller set CL, and any other controller set/program. The memory unit 21 also stores indices defining inputtable coordinate ranges for the respective controller parts configuring the GUI controller.

The display unit 22 is a display element such as a liquid crystal display or an organic EL display, and displays, under control of the control unit 20, various types of information, such as the screen for the GUI controller.

The input unit 23 receives a user operation input. The input unit 23 can be, for example, a keyboard, a mouse, or a touch-sensitive panel that is superimposed and provided on the display unit 22. With the GUI controller being displayed on the display unit 22, when the user operates the touch-sensitive panel superimposed and provided on the display unit 22, the touch-sensitive panel detects a coordinate where a touch is made, the detected coordinate is referred to the indices, and the touch is received as an operation input to a controller part corresponding to the detected coordinate. In addition, an acceleration sensor may be provided as the input unit 23 so as to sense a posture change (i.e. tilt) of the input device 2 as the user operation input. Input devices and/or sensors other than the above-described items may be provided as the input unit 23. The communication unit 24 communicates with the GUI controller design support device 1, the engine 3 and any other component via the network NW and/or other communication lines. The communication unit 24 transmits, for example, the content of operation inputs to the respective controller parts to the engine 3.

The engine 3 is provided with a control unit 30, a memory unit 31 and a communication unit 34.

The control unit 30 implements functions of the engine 3 by executing various programs stored in the memory unit 31. The control unit 30 is implemented by, for example, a CPU, a microcomputer and the like.

The memory unit 31 stores a program to be executed in the control unit 30, data to be used in such program and any other program/data. Specifically, the memory unit 31 stores a program for implementing the execution environment, a driver corresponding to the target device 4, data to be used in these programs and any other program/data.

The execution environment is a runtime for executing a user program. The execution environment receives an execution request resulting from an operation input and the like to the target device 4 and sequentially processes a function and/or a boot block of the user program corresponding to such execution request. Multiple types of the execution environments may be prepared so as to be compatible with various types of programming languages.

The driver is a program mediating between an input or output of the target device 4 and the execution environment, the input or output being communicated via the communication unit 34. Based on the user program executed in the execution environment, the driver implements a function of, for example, outputting a control signal that can be processed at the target device 4 in accordance with such control instruction and/or providing information, such as a sensor output sent from the target device 4, to the user program executed in the execution environment.

The communication unit 34 communicates with the GUI controller design support device 1, the input device 2, the target device 4 and any other component via the network NW and/or other communication lines. Specifically, the engine 3 performs, via the communication unit 34, receipt of the user program from the GUI controller design support device 1, receipt of the content of the operation input from the input device 2, transmission of the control signal to the target device 4, receipt of a sensor output from the target device 4 and any other operation.

The target device 4 is a device to be operated by the GUI controller. Examples of the target device 4 include physical devices, such as a drone, a radio-controlled car or a robot, and devices that operate in a virtual space, such as a 3D model. The target device 4 is provided with a control unit 40, a memory unit 41, a drive unit 42, a sensor unit 43 and a communication unit 44.

The control unit 40 is responsible for the control of the target device 4 by executing a program, such as firmware, stored in the control unit 40. The control unit 40 is implemented by, for example, a microcomputer, a CPU and the like.

The memory unit 41 stores a program (so-called firmware) that operates in response to a signal transmitted from the driver operating in the engine 3. The drive unit 42 is a member that implements the operation of the target device 4 and is configured by, for example, a motor, an actuator, drivers for these elements and the like. The sensor unit 43 is configured by sensors that acquire various types of information from the environment of the target device 4. Examples of the sensor unit 43 may include a camera, an acceleration sensor, a GPS receiver, a ranging sensor, an infrared radiation sensor and the like.

The communication unit 44 communicates with the engine 3 via the network NW and/or other communication lines. Specifically, the target device 4 receives a control signal from the engine 3 and transmits information acquired with the sensor unit 43 to the engine 3 as needed via the communication unit 44.

Controller Set

Next, the controller set CL that defines the GUI controller will be described.

The controller set CL contains a set (list) of controller part instances and a program (user program) that defines processing corresponding to a user-created operation.

The arrangement and/or appearance of the respective controller parts that configure the controller set CL are defined by a user using a controller part editing function, which will be described hereinafter. The appearance of the GUI controller is defined by combining a plurality of controller parts contained in the controller set CL. The user program utilizes the defined controller parts and is implemented with an arbitrary program.

The controller set CL contains static attributes including: a UUID (Universally Unique Identifier), which is identification information for identifying a GUI controller in a globally unique manner; a controller name, which is a name given to the controller; a change tracking number for managing change tracking of the controller; a driver type that indicates a device targeted by the controller; a device orientation that indicates the orientation (horizontal/vertical) of the input device 2 when displaying the GUI controller defined by such controller set; skin information that indicates an image for representing (drawing) the respective parts of the GUI controller and/or the background; a setting for selecting the execution environment in which the user program contained in the controller set CL is to be executed; and any other attribute.

The controller part is a member that can be used by being arranged in the GUI controller and that implements various control patterns in response to the user operation input. An addition of a plurality of instances, as controller parts, to a single controller set is allowed, and each controller part is provided with unique identification information. With the user program, the instances of the respective controller parts can be identified and utilized with this identification information.

There are various types of controller parts. The controller parts have particular attributes, states and/or behaviors for each type, and are enabled to be instantiated without limit and to be utilized from the user program by identifying them for each instance.

The respective controller parts contain a common attribute including a part name, which is a unique name within the controller. Various types of the controller parts are prepared, including a joystick, a cross key, a button, a switch, a slider, a dial, a gesture, a text output area, a video/image output area and the like. A defined attribute (static attribute) and/or a state attribute (input state), which can be set for each type of these controller parts, is/are retained.

The defined attribute is a predefined and stationary attribute. The status attribute is an attribute that changes depending on the program execution status and/or the controller operation status by the user. For example, with the joystick, the display size, the minimum value, the maximum value, the display position, the displayed color at the time of active status, the frame-out determination precision, the number of times of trajectory determination touches, the program notification frequency that indicates the frequency of notifying the user program of the operation input and any other attribute are defined as the defined attributes. Except for the parts that can be set as overlays, the display position of each controller part is defined such that the controller parts are displayed without being overlapped with each other. The active flag, the start coordinate information, the prior-to-movement coordinate information, the posterior-to-movement coordinate information and any other attribute are recorded and retained, as the status attributes, depending on the program execution status and/or the controller operation status by the user.

Next, a controller set editing function, an execution environment editing function, a driver editing function, a controller part editing function and a user program editing function provided by the GUI controller design support device 1 will be described.

Execution Environment Editing Function

The execution environment editing function is implemented as a program executed by the control unit 10. The execution environment editing function generates an instance of the execution environment that is an environment on the engine 3 in which the user program is executed, and provides a screen for inputting setting values for different setting items for such generated instance. The setting values can be changed by the input from the user through this screen. At the engine 3, multiple types of execution environments (for example, with differing script languages) are allowed to be utilized simultaneously, and the execution environment editing function can select any of the available execution environments and edit the setting of such environment.

Driver Editing Function

The driver editing function is implemented as a program executed by the control unit 10. The driver is an object that is called from the user program and utilized in order to control the target device 4. The driver editing function provides a screen for making a user select a driver for controlling the target device 4. When the user selects the desired driver on this screen, an instance of the selected driver is generated in the engine 3, and processing is executed for giving identification information to the generated instance. The user program implements the control of the target device 4 through the desired driver by designating this identification information. The driver editing function provides a screen for inputting setting items for the generated driver instance. The setting values can be changed by input from the user through this screen.

Controller Set Editing Function

The controller set editing function is implemented by a program executed by the control unit 10. The controller set editing function starts by the user selecting editing of the GUI controller from a menu displayed on the display unit 12. The controller set editing function is enabled both to newly create a controller set and to edit an existing controller set. When newly creating a controller set, the user makes a selection accordingly from the menu. When editing an existing controller set, the user selects an existing controller set stored in the memory unit 11. When a newly-created or existing GUI controller set is selected, an instance of the corresponding controller set is generated. Then, an execution environment corresponding to such controller set is activated and a user program contained in such controller set is registered with the activated execution environment. In addition, the reference to the instance of the controller set may be passed to the input device 2.

Controller Part Editing Function

The controller part editing function is a function that edits various attributes for the respective controller parts configuring the controller set. The controller part editing function starts by the user selecting editing of the controller part from the menu displayed on the display unit 12 after the execution of the controller set editing function.

When the controller part editing function starts, the display unit 12 displays an editing area R1. The editing area R1 is a display area for editing the arrangement, appearance and the like of the controller parts to be displayed on the screen of the input device 2 while visually checking such arrangement, appearance and the like. When newly creating a GUI controller, the editing area R1 is left blank at the time of startup. On the other hand, when editing an existing GUI controller, the editing area R1 displays the GUI controller that is stored based on the controller set selected at the time of startup.

The user is enabled to freely create and edit a GUI controller by arranging a desired controller part in the editing area R1, moving, deleting and/or editing (changing of the various attribute values) of the arranged controller part. Sample forms of the controller parts that can be arranged in the editing area R1 are pre-stored in the memory unit 11. These sample forms are configured such that they can be selected and arranged at any positions by the user as needed via a user interface. As to the already-arranged controller parts, selection is enabled by a tapping on the touch-sensitive panel and/or a click with a mouse cursor hovering thereover, and movement is enabled by a so-called drag operation. In addition, editing of a defined attribute of an already-arranged controller part is enabled by double-clicking or double-tapping such already-arranged controller tap.

When the editing of the controller part is confirmed through a storing operation and/or an automatic storing function that stores the changed content, the controller part corresponding to the edited GUI controller is stored in the memory unit 11. At this time, the input device 2 implements registration or updating of the controller part contained in the controller set with the indices based on the instance of the referred controller set.

User Program Editing Function

The user program editing function is implemented by a program executed by the control unit 10. The user program editing function starts by the user selecting editing of the user program from the menu displayed on the display unit 12. The user program editing function is enabled both to newly create a user program and to edit an existing user program. When newly creating a user program, the user makes a selection accordingly from the menu. When editing an existing user program, the user selects an existing user program stored in the memory unit 11.

When the user program editing function starts, the display unit 12 displays an editing area R2. The editing area R2 can be, for example, a text editor that can edit a source code of the user program depending on the programming language used, an editor for implementing a GUI block programming, or the like. When newly creating a user program, the editing area R2 is left blank at the time of startup. On the other hand, when editing an existing user program, the editing area R2 displays the user program selected at the time of startup.

The user is enabled to edit a source code of the user program within the editing area R2. Within the user program, each instance of the controller parts contained in the GUI controller created by the GUI controller editing function and/or the driver corresponding to the target device 4 are differentiated by the identification information and can be utilized as a boot block, an entry point (function) or a variable. These available instances are configured such that the user can make a selection as appropriate and perform insertion at an arbitrary position within the source code via a user interface. In this way, the user associates programs to be booted (functions, boot blocks) with the operation inputs performed on the respective controller parts and/or the driver.

When the editing of the user program is confirmed (through a registration operation, etc.), the control unit 10 of the GUI controller design support device 1 immediately evaluates the program context. If there is no problem in terms of context, the program context will be retained in the execution environment of the engine 3. It should be noted that if the context is assured as a block, as in so-called block programming, there may be no need to evaluate the context.

The edited user program may be stored in the memory unit 11 through a storing operation and/or an automatic storing function that stores the changed content, and the edited user program may be transmitted to the engine 3 having an execution environment corresponding to the program language edited by the user to register the user program. It should be noted that if the context is assured as a block, as in so-called block programming, edited information will be immediately registered with the execution environment in conjunction with the user operation.

Next, a description is provided for a procedure for controlling the target device 4 with a GUI controller displayed on the input device 2 and a procedure of processing performed when editing and updating an existing GUI controller and user program, in the above-described environment for remote control to which the GUI controller design support device 1 is applied.

As a state prior to editing, a prior-to-editing controller set of a GUI controller is registered with the input device 2 and a prior-to-editing user program is registered with the engine 3.

Figure 2:
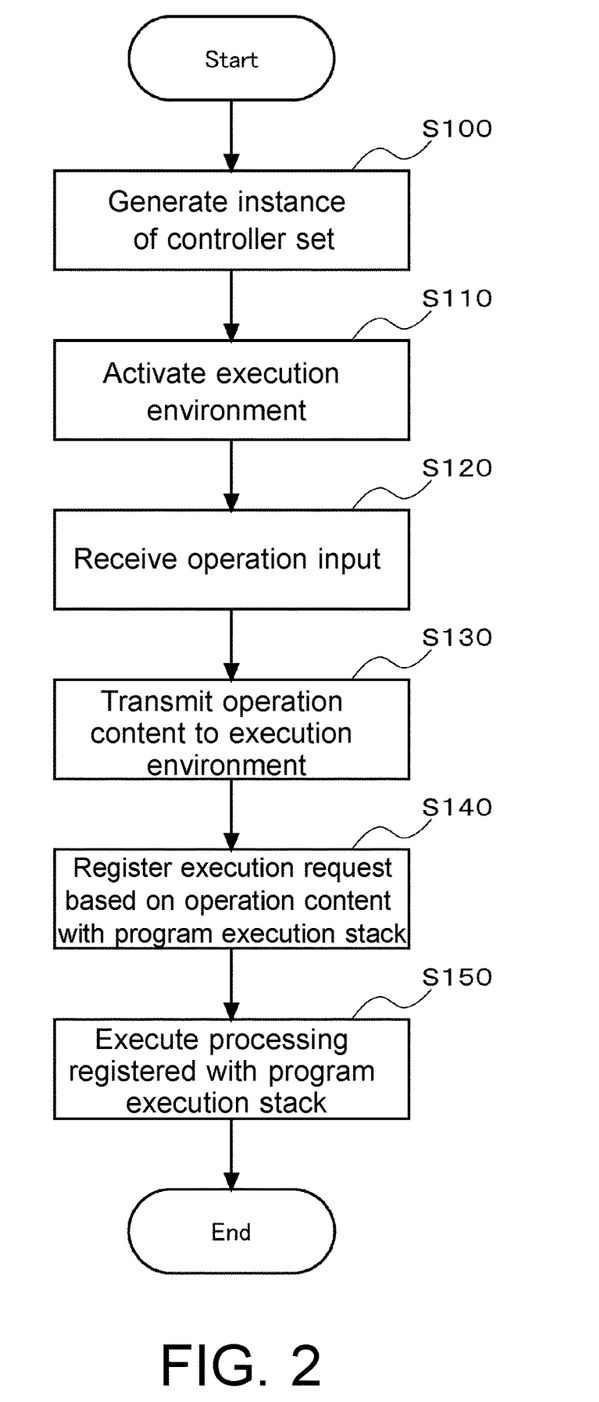
FIG. 2 is a flowchart illustrating a procedure performed when controlling a target device 4 via an engine 3 by a GUI controller registered with an input device 2.

FIG. 2 is a flowchart illustrating a procedure performed when controlling the target device 4 via the engine 3 by the GUI controller registered with the input device 2. First, the user generates an instance of the controller set using the controller set editing function as described above (step S100). Next, an execution environment of the engine 3 is activated which is necessary for execution of a user program according to the controller set instance (step S110). At this time, the controller set is registered with the input device 2. In addition, the user program is registered with the execution environment of the engine 3. Here, the state in which "the execution environment is activated" refers to the state in which the execution environment is waiting for some events, such as an execution request and/or registration of a program and an update request, while executing an infinite loop as the "main" function. It should be noted that the generation of the controller set instance (step S100) and the activation of the execution environment (step S110) are performed in random order.

The input device 2 displays the registered GUI controller on the display unit 22 and receives a user operation input to the input unit 23 (for example, a touch-sensitive panel superimposed on the display unit 22) (step S120). The content of the received operation input is sent to the execution environment activated in the engine 3 as an execution request event containing identification information corresponding to an instance of the operated controller part, a parameter value sensed in association with the operation, or the like (step S130).

A driver which is available in the engine 3 is connected to the target device 4, which is in the activated state, and can transmit/receive a control signal and/or sensor output. The connection to the driver may be managed by a so-called Keep-Alive method. In general, the driver transmits the control signal to the target device 4 in response to a call from the user program executed in the execution environment. In addition, as caused by the sensor output from the target device 4, the driver sends the execution request containing the identification information corresponding to the instance of the driver, the value in association with the sensor output, or the like, to the execution environment activated in the engine 3.

When the execution request event is issued for the execution environment based on an operation performed on the GUI controller of the input device 2 and/or a request from the driver, a boot block or function corresponding to the instance of the controller part and/or driver, which is/are the origin(s) of such execution request, is registered as a program execution stack for such execution environment (step S140). Processing registered with the program execution stack is sequentially executed along with event processing for each loop of the infinite loop being executed as the "main" function (step S150).

The input device 2 displays the registered GUI controller on the display unit 22, receives a user operation input to the input unit 23 (for example, a touch-sensitive panel superimposed on the display unit 22), sends the content thereof to the execution environment activated in the engine 3, and changes a GUI representation (appearance) (for example, animation display, etc.) of a controller part in response to the operation input.

In such environment, a corresponding entry point of the user program is executed in the execution environment activated in the engine 3 in response to the operation input to the GUI controller displayed on the input device 2, and control of the target device 4 is executed via the driver.

Figure 3:
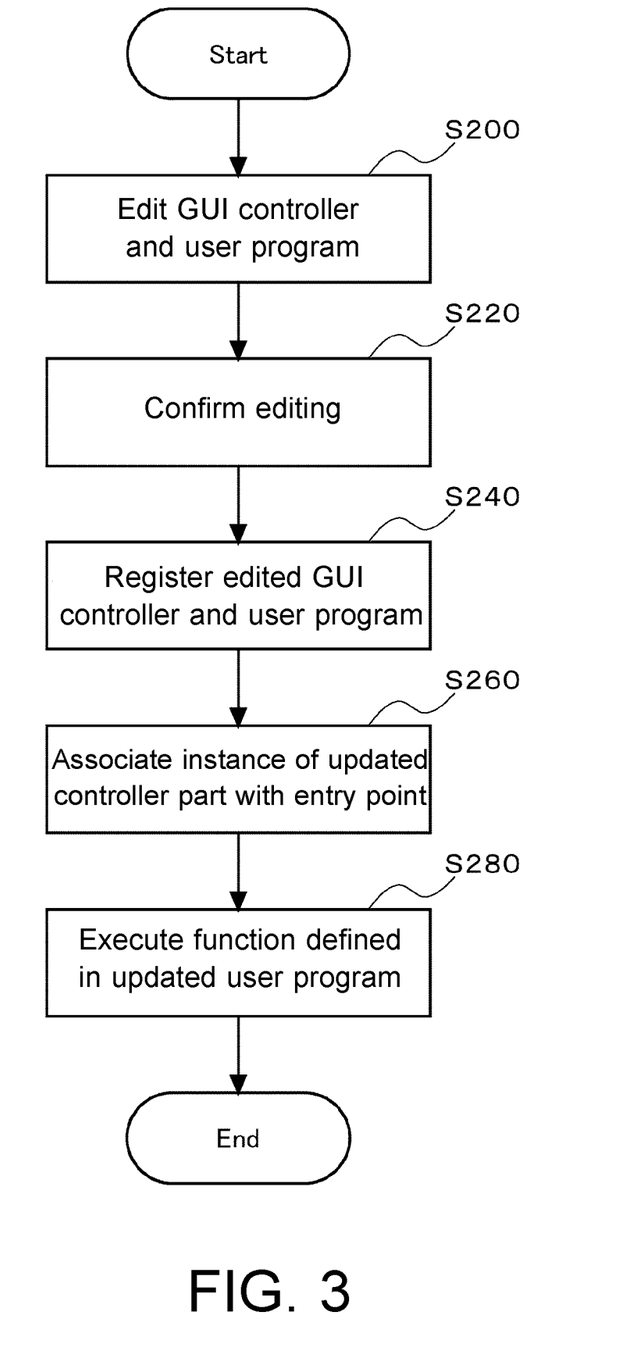
FIG. 3 is a flowchart illustrating a procedure of processing performed when editing and updating an existing GUI controller and user program.

Next, processing performed when editing and updating an existing GUI controller and user program will be described. FIG. 3 is a flowchart illustrating a procedure of processing performed when editing and updating an existing GUI controller and user program.

When editing a GUI controller and user program, definition and arrangement of controller parts, editing of a user program or any other operation is performed at the GUI controller design support device 1 using the GUI controller editing function and the user program editing function (step S200). When the editing is completed, the corresponding editing is confirmed in the controller part editing function and the user program editing function (step S220). Registration is performed in the input device 2 regarding the controller set, and registration is performed in the engine 3 regarding the user program (step S240). Editing and registration of the GUI controller and user program can be performed at an arbitrary timing without the need to reboot the input device 2, the engine 3 and the target device 4. Therefore, operations performed on the respective controller parts configuring the GUI controller and the behavior of the target device 4 can be reflected to the system in real time.

As described above, in the environment for remote control of the present embodiment, the engine 3 associates the received execution request and the entry point (a function and/or boot block) with each other using the identification information of the controller part instances contained in the execution request. When the edited GUI controller and user program are registered, the correspondence between the identification information of the controller part instances and the entry points may be changed; however, this correspondence is defined in the edited user program and is registered with the execution environment of the engine 3 (step S260). When update of the controller set indicating the configuration of the GUI controller is registered with the input device 2, display of the GUI controller displayed on the input device 2, notification from the controller parts, and any other operation, may be changed in response to the content of the update.

The activated execution environment continues to execute the infinite loop, as the main function, before and after the registration. When an updated GUI controller and user program are registered, a function and/or variable with the identical name may be replaced with a new value. However, for functions associated with the execution requests registered with the program execution stack prior to the update, a function defined in the pre-updated user program is executed. For the execution requests registered with the program execution stack after the update, a function defined in a new user program is executed (step S280).

According to the GUI controller design support device in the above-described present embodiment, the programming can be supported for a controller device that is capable of changing control and/or graphic representation flexibly and in real time.

It should be noted that the present embodiment is described above; however, the present invention is not limited to these examples. For example, although the GUI controller design support device 1, the input device 2 and the engine 3 are implemented as separate pieces of hardware in the above-described embodiment, a plurality or all of these components may be implemented by a single piece of hardware (for example, a single computer). Embodiments obtained by a person skilled in the art performing an addition and/or deletion of a component, and/or a design change as appropriate to the above-described respective embodiments, and embodiments obtained by combining features of the respective embodiments as appropriate, are also encompassed within the scope of the present invention as long as they are provided with the gist of the present invention.

DESCRIPTION OF REFERENCE NUMERALS

1 GUI controller design support device
2 input device
3 engine
4 target device
NW network

The invention claimed is:

1. A system for remote control, comprising:
a GUI controller design support device that supports designing of a GUI controller;
an input device provided with a touch-sensitive panel display, the touch-sensitive panel display displaying the GUI controller for receiving an operation input for operating a target device, the target device comprising at least one of a drone, a radio-controlled car, a robot, and a device that operates in a virtual space; and
an engine, wherein:
the GUI controller design support device comprises:
a controller set editing unit that edits a controller set, the controller set containing and being configured by a plurality of controller parts and defining the GUI controller,
a controller part editing unit that edits the respective controller parts contained in the controller set,
a user program editing unit that edits a user program, the user program defining control of the target device in response to the operation input being input to the controller part,
a GUI controller registration unit that registers the controller set edited at the controller set editing unit and the controller part editing unit with the input device in a state where the engine, on which a driver that is an object called from the user program and utilized in order to control the target device is operated, activates an execution environment for executing the user program, and
a user program registration unit that registers the user program edited at the user program editing unit with the engine in the state where the engine, on which the driver that is the object called from the user program and utilized in order to control the target device is operated, activates the execution environment for executing the user program,
the input device receives the operation input to the GUI controller displayed on the touch-sensitive panel display and transmits a program execution request including identification information of an instance of the control part that received the operation input to the engine,
the input device enables updating of the controller set of the GUI controller associated with the user program in the state where the engine activates the execution environment for executing the user program without a need to reboot,
the engine waits for the program execution request in the state where the engine activates the execution environment for executing the user program and, when the program execution request is received from the input device, operates the driver to control the target device by executing an entry point of the user program corresponding to the identification information of the instance of the control part included in the program execution request, and
the engine enables updating of the user program in the state where the execution environment is activated for executing the user program without the need to reboot.

* * * * *